United States Patent
Gilton et al.

(10) Patent No.: US 12,284,272 B2
(45) Date of Patent: Apr. 22, 2025

(54) METHODS AND SYSTEMS FOR STARTING SECURE COMMUNICATION IN SYSTEMS WITH HIGH AVAILABILITY

(71) Applicants: General Electric Company, Schenectady, NY (US); BAE Systems Controls Inc., Endicott, NY (US)

(72) Inventors: Jeffrey S. Gilton, Cincinnati, OH (US); Matthew B. Pfenninger, Cincinnati, OH (US); Douglas R. Nichols, Kentwood, MI (US); Russell Seidel, Endicott, NY (US)

(73) Assignees: General Electric Company, Evendale, OH (US); BAE Systems Controls Inc., Endicott, NY (US)

( * ) Notice: Subject to any disclaimer, the term of this patent is extended or adjusted under 35 U.S.C. 154(b) by 272 days.

(21) Appl. No.: 17/956,939

(22) Filed: Sep. 30, 2022

(65) Prior Publication Data

US 2024/0113867 A1    Apr. 4, 2024

(51) Int. Cl.
*H04L 9/08* (2006.01)
*H04L 9/06* (2006.01)
(Continued)

(52) U.S. Cl.
CPC .............. *H04L 9/0833* (2013.01); *H04L 9/06* (2013.01); *H04L 9/0841* (2013.01); *H04L 9/085* (2013.01);
(Continued)

(58) Field of Classification Search
None
See application file for complete search history.

(56) References Cited

U.S. PATENT DOCUMENTS

| | | | |
|---|---|---|---|
| 6,677,888 B2 | 1/2004 | Roy | |
| 6,990,662 B2 * | 1/2006 | Messer | G06F 9/547 709/204 |

(Continued)

FOREIGN PATENT DOCUMENTS

| | | |
|---|---|---|
| EP | 1800409 B1 | 6/2007 |
| EP | 2139172 B1 | 12/2009 |

(Continued)

OTHER PUBLICATIONS

Extended European Search Report for Application No. 23185950.5 dated Mar. 1, 2024 (5 pages).

*Primary Examiner* — Lashonda Jacobs-Burton
(74) *Attorney, Agent, or Firm* — Dinsmore & Shohl LLP (57) ABSTRACT

A distributed control system includes an electronic control unit to establish secure communication with a distributed control module. Upon determination that a previously negotiated session key is stored on the electronic control unit, the electronic control unit transmits encrypted communications with the distributed control module using the previously negotiated session key, negotiates a new session key with the distributed control module, and stores the new session key. Upon determination that the previously negotiated session key is not stored on the electronic control unit, the electronic control unit negotiates the new session key with the distributed control module. After negotiating the new session key with the distributed control module, the electronic control unit ceases transmission of unencrypted communications with the distributed control module, transmits encrypted communications with the distributed control module using the new session key, and stores the new session key.

20 Claims, 6 Drawing Sheets

(51) Int. Cl.
*H04L 9/40* (2022.01)
*H04W 12/041* (2021.01)
*H04W 12/069* (2021.01)

(52) U.S. Cl.
CPC ........ H04L 9/0894 (2013.01); H04L 63/0435 (2013.01); *H04L 2209/84* (2013.01); *H04W 12/041* (2021.01); *H04W 12/069* (2021.01)

(56) References Cited

U.S. PATENT DOCUMENTS

| | | | |
|---|---|---|---|
| 7,020,708 B2 | 3/2006 | Nelson et al. | |
| 7,552,321 B2 | 6/2009 | Rockwood et al. | |
| 8,359,389 B1* | 1/2013 | Cohen | H04W 24/00 |
| | | | 709/224 |
| 8,479,260 B2 | 7/2013 | Price | |
| 8,811,616 B2 | 8/2014 | Cabos | |
| 8,825,227 B2 | 9/2014 | Saint-Marc et al. | |
| 8,898,291 B2* | 11/2014 | Boss | H04L 43/0876 |
| | | | 709/224 |
| 8,910,169 B2* | 12/2014 | Wang | G06F 1/3203 |
| | | | 718/102 |
| 9,576,404 B2 | 2/2017 | Ziarno et al. | |
| 9,826,039 B2 | 11/2017 | Goldstein et al. | |
| 10,237,077 B2* | 3/2019 | Winkelvos | H04L 9/3247 |
| 10,353,745 B1* | 7/2019 | Sait | G06F 9/5077 |
| 10,432,590 B2* | 10/2019 | Skuratovich | H04L 63/061 |
| 10,567,242 B2* | 2/2020 | Plumelle | H04L 41/5054 |
| 10,623,130 B2 | 4/2020 | Skertic | |
| 11,178,158 B2* | 11/2021 | Buffard | H04L 9/3297 |
| 11,418,364 B2* | 8/2022 | Tang | H04L 9/0822 |
| 11,916,970 B2* | 2/2024 | Novo Diaz | H04L 63/0428 |
| 2008/0294894 A1 | 11/2008 | Dubhashi et al. | |
| 2009/0217043 A1 | 8/2009 | Metke et al. | |
| 2010/0005473 A1* | 1/2010 | Blanding | G06F 9/5044 |
| | | | 718/104 |
| 2010/0191967 A1* | 7/2010 | Fujii | H04L 63/0861 |
| | | | 713/169 |
| 2011/0107101 A1* | 5/2011 | Funk | H04L 9/0863 |
| | | | 713/170 |
| 2012/0185776 A1* | 7/2012 | Kirshenbaum | G06F 9/5094 |
| | | | 715/735 |
| 2013/0036308 A1 | 2/2013 | Buch et al. | |
| 2013/0042005 A1* | 2/2013 | Boss | H04L 43/0876 |
| | | | 709/226 |
| 2013/0305391 A1 | 11/2013 | Haukom et al. | |
| 2014/0173619 A1* | 6/2014 | Nakashima | G06F 9/5061 |
| | | | 718/104 |
| 2015/0127410 A1* | 5/2015 | Abuelsaad | G06F 9/5077 |
| | | | 705/7.25 |
| 2015/0378786 A1* | 12/2015 | Suparna | G06F 9/5016 |
| | | | 718/104 |
| 2017/0163607 A1* | 6/2017 | Skuratovich | H04L 63/061 |
| 2019/0028448 A1* | 1/2019 | Farrell | H04L 63/062 |
| 2019/0268763 A1* | 8/2019 | Alfred | H04L 63/061 |
| 2019/0305939 A1* | 10/2019 | Nakagawa | H04W 12/03 |
| 2020/0007319 A1* | 1/2020 | Herzerg | H04L 9/0819 |
| 2020/0045540 A1* | 2/2020 | Hutchison | H04W 4/38 |
| 2020/0198797 A1 | 6/2020 | Skertic et al. | |
| 2020/0204400 A1 | 6/2020 | Skertic et al. | |
| 2020/0285207 A1 | 9/2020 | Lu et al. | |
| 2021/0099292 A1* | 4/2021 | Gilton | H04L 9/3247 |
| 2022/0123957 A1* | 4/2022 | Gilton | H04L 12/40 |
| 2022/0150061 A1* | 5/2022 | Iaremenko | H04L 9/0819 |
| 2024/0048536 A1* | 2/2024 | Recio | H04L 67/146 |

FOREIGN PATENT DOCUMENTS

| | | |
|---|---|---|
| FR | 3070565 B1 | 1/2020 |
| JP | 2019040323 A | 3/2019 |

* cited by examiner

METHODS AND SYSTEMS FOR STARTING SECURE COMMUNICATION IN SYSTEMS WITH HIGH AVAILABILITY

FEDERALLY SPONSORED RESEARCH STATEMENT

This invention was made with Government support under Contract No. W58RGZ-19-C-0003 awarded by the Department of the Army. The Government has certain rights in the invention.

FIELD

The present disclosure relates to devices, systems, and methods for communicating between devices in an aircraft system, and more specifically, to methods and systems for starting secure communication in systems with high availability.

BACKGROUND

Aircraft and other systems often include distributed control systems with embedded devices. Secure communication between the embedded components is important for security and other reasons. In addition, establishing secure communication protocols between embedded products in a distributed control system may be needed.

DETAILED DESCRIPTION

The present disclosure generally relates to devices, systems, and methods for establishing secure communication protocols between embedded devices in a distributed control system, such as an aircraft system with distributed architecture. The devices, systems, and methods described herein ensure that communication is only between devices within the distributed control system. This ensures integrity and confidentially of the data transmitted between devices. When combined with a secure boot, this ensures that the distributed control system has not been tampered with, thereby ensuring a secure system.

One method of ensuring secure communication between devices is to use a session key. In particular, a session key may be used by a device to encrypt messages to be sent to another device and/or to decrypt messages received from the other device. As such, devices can communicate with each other in a secure fashion.

However, in order for communication using a session key to be secure, the session key itself must be negotiated between two devices in a secure manner. A variety of methods may be utilized to securely negotiate a session. For example, a Diffie-Hellman key exchange uses modular arithmetic involving public-private key pairs made up of large prime numbers (typically hundreds of bits long) to establish a symmetric session key that can be used to encrypt communications between devices. This method is highly secure if the prime numbers used are large enough. However, establishing a secure communication protocol using a system such as Diffie-Hellman key exchange may require many transmissions and significant traffic between devices and may take several seconds to complete, depending on processor loading. Other methods may also be used to negotiate a session key, but other such methods are also likely to take some time to complete.

Accordingly, if two devices need to quickly establish communication with each other before a secure session key can be negotiated between the two devices, an alternative communication protocol may be desired. This may be important to ensure quick communication between devices upon system startup or after a system reset to ensure safe engine operation.

As such, in embodiments disclosed herein, in order to quickly establish communication between devices, if a session key exists that was created during a previous communication session between the devices, the devices may use the previously negotiated session key to begin encrypted communication with each other. If there is no session key created during a previous communication session (e.g., during the first time that two devices communicate with each other), then the devices may begin communicating using unencrypted communication. Once communication begins, either unencrypted or using a previously negotiated session key, a new session key may be negotiated, while communication is ongoing. After the new session key is negotiated, the devices may begin using the new session key to transmit encrypted communication and the devices may store the new session key for a future communication session. Accordingly, embodiments disclosed herein have a technical effect of quickly establishing secure communications between devices in a distributed control system.

It should be understood that, while the embodiments described herein relate particularly to a distributed control system that is used to control components of an aircraft, the present disclosure is not limited to such. That is, similar systems and methods may be used for other applications without departing from the scope of the present disclosure. For example, the systems and methods described herein could be used for other distributed systems, such as chemical plants, power plants, water management systems, pharmaceutical manufacturing systems, and the like.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of 'a', 'an', and 'the' include plural referents unless the context clearly dictates otherwise.

Figure 1:
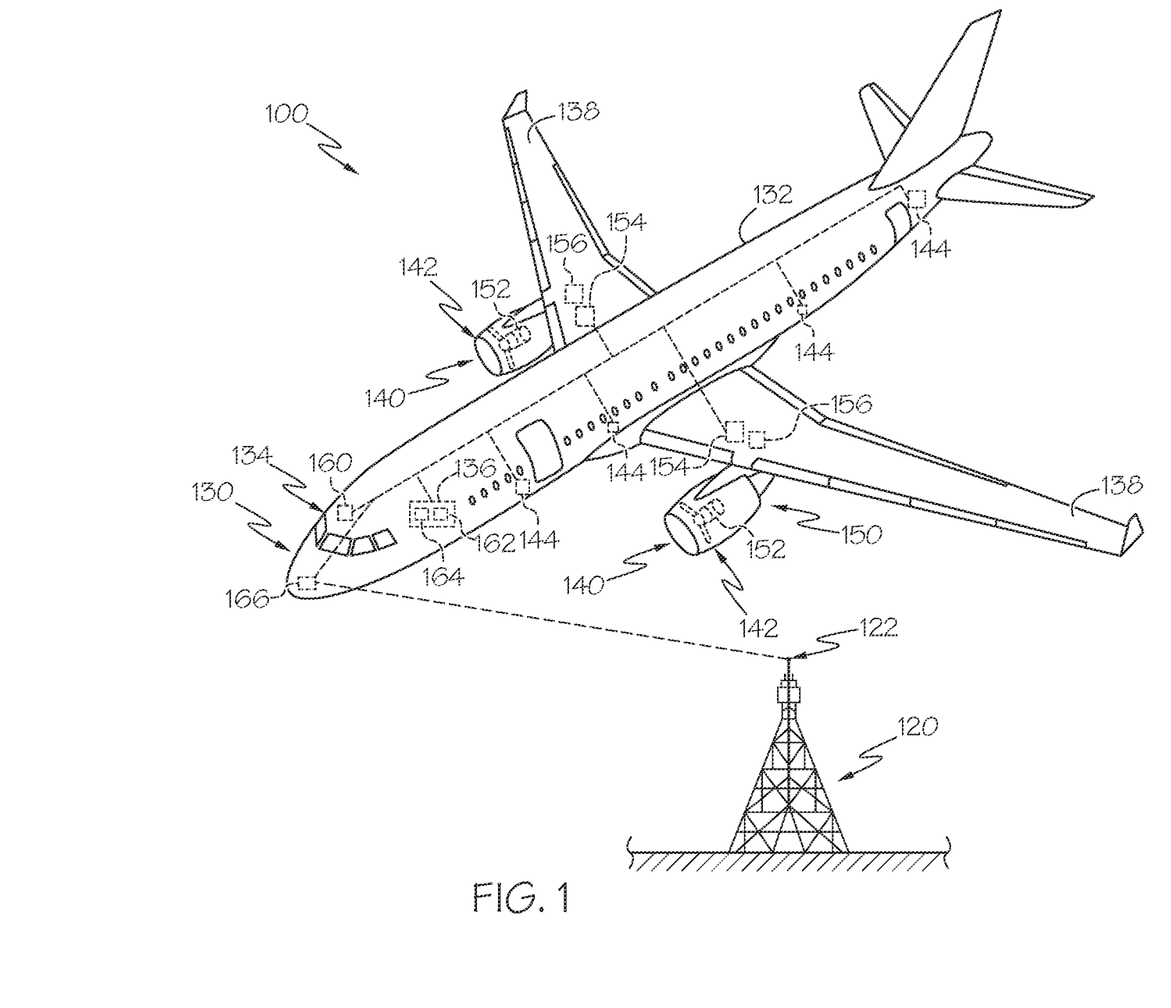
FIG. 1 schematically depicts an illustrative distributed control system according to one or more embodiments shown and described herein.

FIG. 1 depicts an illustrative distributed control system 100, which is used to control various components of an aircraft 130 according to various embodiments. The aircraft 130 generally includes a fuselage 132, wing assemblies 138, and one or more engines 140. While FIG. 1 depicts the aircraft 130 as being a fixed-wing craft having two wing assemblies 138 with one engine 140 mounted on each wing assembly 138 (two engines 140 total), other configurations are contemplated. For example, other configurations may include more than two wing assemblies 138, more than two engines 140 (e.g., trijets, quadjets, etc.), engines 140 that are not mounted to a wing assembly 138 (e.g., mounted to the fuselage 132, mounted to the tail, mounted to the nose, etc.), non-fixed wings (e.g., rotary wing aircraft), and/or the like.

As illustrated in FIG. 1, the aircraft 130 may include the engines 140 coupled to the wing assemblies 138 and/or the fuselage 132, a cockpit 134 positioned in the fuselage 132, and the wing assemblies 138 extending outward from the fuselage 132. A control mechanism 160 for controlling the aircraft 130 is included in the cockpit 134 and may be operated by a pilot located therein. It should be understood that the term "control mechanism" as used herein is a general term used to encompass all aircraft control components, particularly those typically found in the cockpit 134.

A plurality of additional aircraft systems 144 that enable proper operation of the aircraft 130 may also be included in the aircraft 130 as well as an engine controller 136, and a communication system having the aircraft wireless communications link 166. The additional aircraft systems 144 may generally be any systems that effect control of one or more components of the aircraft 130, such as, for example, cabin pressure controls, elevator controls, rudder controls, flap controls, spoiler controls, landing gear controls, heat exchanger controls, and/or the like. In some embodiments, the avionics of the aircraft 130 may be encompassed by one or more of the additional aircraft systems 144. The aircraft wireless communications link 166 may generally be any air-to-ground communication system now known or later developed. Illustrative examples of the aircraft wireless communications link 166 include, but are not limited to, a transponder, a very high frequency (VHF) communication system, an aircraft communications addressing and reporting system (ACARS), a controller-pilot data link communications (CPDLC) system, a future air navigation system (FANS), and/or the like. The engine controller 136 may be operably coupled to the plurality of aircraft systems 144 and the engines 140. While the embodiment depicted in FIG. 1 specifically refers to the engine controller 136, it should be understood that other controllers may also be included within the aircraft 130 to control various other aircraft systems 144 that do not specifically relate to the engines 140.

In some embodiments, the engine controller 136 is mounted on the one or more engines 140. However, the engine controller 136 may be mounted to or integrated with other aircraft components in other embodiments. For example, the engine controller 136 may be mounted within the aircraft 130 (e.g., not on the one or more engines 140) in some embodiments, including the embodiment of FIG. 1. The engine controller 136 may also be communicatively coupled to other controllers of the aircraft 130. In embodiments, the engine controller 136 may include a processor 162 and/or memory 164, including non-transitory memory.

In some embodiments, the memory 164 may include random access memory (RAM), read-only memory (ROM), flash memory, or one or more different types of portable electronic memory, such as discs, DVDs, CD-ROMs, or the like, or any suitable combination of these types of memory. The processor 162 may carry out one or more programming instructions stored on the memory 164, thereby causing operation of the engine controller 136. That is, the processor 162 and the memory 164 within the engine controller 136 may be operable to carry out the various processes described herein with respect to the engine controller 136, including operating various components of the aircraft 130 (such as the engine 140 and/or components thereof), monitoring the health of various components of the aircraft 130 (e.g., the engine 140 and/or components thereof), monitoring operation of the aircraft 130 and/or components thereof.

Figure 2:
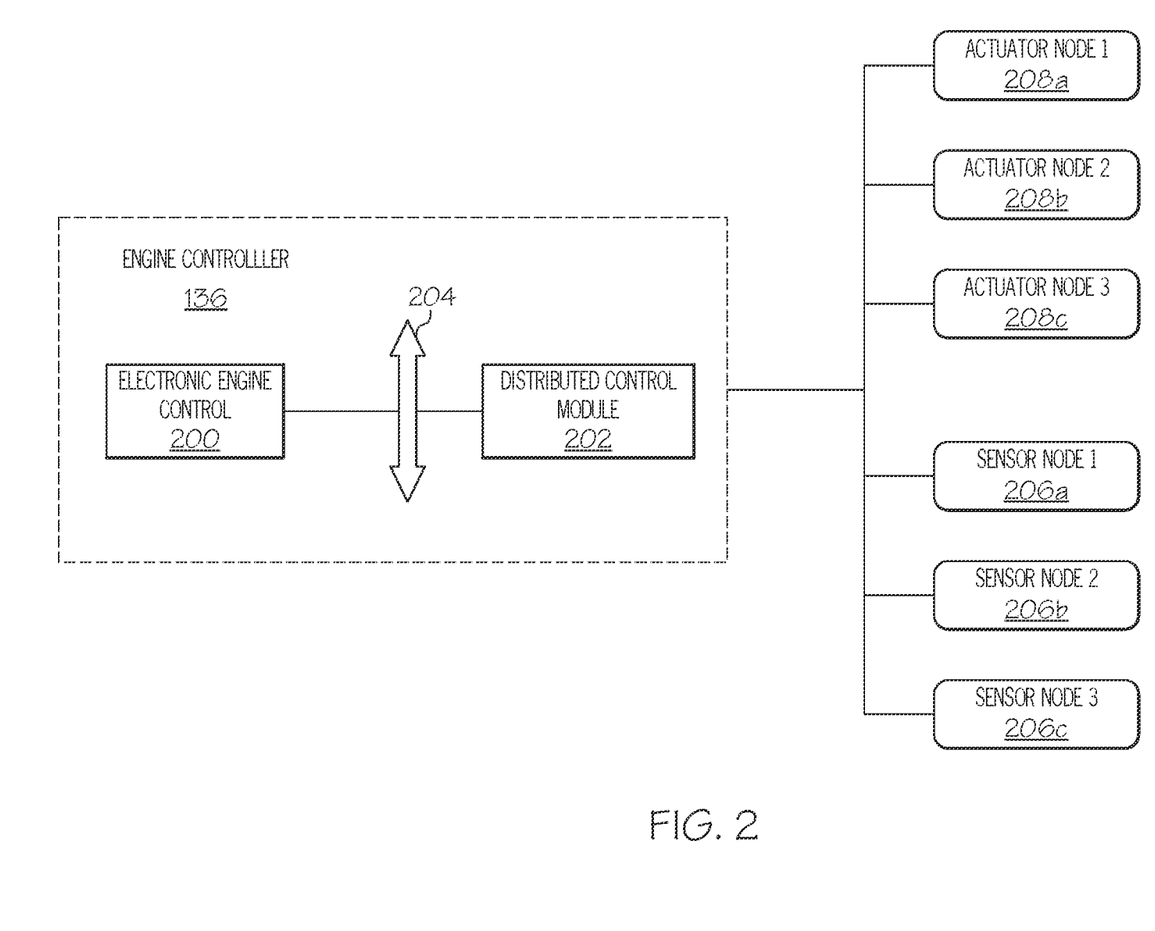
FIG. 2 schematically depicts a portion of the distributed control system of FIG. 1.

In some embodiments, the engine controller 136 may be a full authority digital engine control (FADEC) system. The FADEC system includes an electronic engine controller (EEC) 200 or engine control unit (ECU) or electronic control unit and a distributed control module (DCM) 202, as shown in FIG. 2, and described in further detail below. Returning to FIG. 1, the FADEC system may also contain one or more additional components that are configured to control various aspects of performance of the engines 140. The FADEC system generally has full authority over operating parameters of the engines 140 and cannot be manually overridden. A FADEC system generally functions by receiving a plurality of input variables of a current flight condition, including, but not limited to, air density, throttle lever position, engine temperature, engine pressure, and/or the like. The inputs are received, analyzed, and used to determine operating parameters such as, but not limited to, fuel flow, stator vane position, bleed valve position, and/or the like. The FADEC system may also control a start or a restart of the engines 140. The operating parameters of the FADEC can be modified by installing and/or updating software. As such, the FADEC can be programmatically controlled to determine engine limitations, receive engine health reports, and receive engine maintenance reports and/or the like to undertake certain measures and/or actions in certain conditions.

In some embodiments, the engine controller 136 may include one or more programming instructions for diagnosing and/or predicting one or more engine system faults in the aircraft 130. Diagnosed and/or predicted faults may include, but are not limited to, improper operation of components, failure of components, indicators of future failure of components, and/or the like. As used herein, the term diagnosing refers to a determination after the fault has occurred and contrasts with prediction, which refers to a forward looking determination that makes the fault known in advance of when the fault occurs. Along with diagnosing, the engine controller 136 may detect the fault.

The program run by the engine controller 136 (e.g., executed by the processor 162 and stored within the memory 164) may include a computer program product that includes machine-readable media for carrying or having machine-executable instructions or data structures. Such machine-readable media may be any available media, which can be accessed by a general purpose or special purpose computer or other machine with a processor. Generally, such a computer program may include routines, programs, objects, components, data structures, algorithms, and/or the like that have the technical effect of performing particular tasks or implementing particular abstract data types. Machine-executable instructions, associated data structures, and programs represent examples of program code for executing the exchange of information as disclosed herein. Machine-executable instructions may include, for example, instructions and data, which cause a general purpose computer, special purpose computer, or special purpose processing machine to perform a certain function or group of functions. In some embodiments, the computer program product may be provided by a component external to the engine controller 136 and installed for use by the engine controller 136.

In embodiments, each of the engines 140 may include a fan 142 and one or more sensors 150 for sensing various characteristics of the fan 142 during operation of the engines 140. Illustrative examples of the one or more sensors 150 include, but are not limited to, a fan speed sensor 152, a temperature sensor 154, and a pressure sensor 156. The fan speed sensor 152 is generally a sensor that measures a rotational speed of the fan 142 within the engine 140. The temperature sensor 154 may be a sensor that measures a fluid temperature within the engine 140 (e.g., an engine air temperature), a temperature of fluid (e.g., air) at an engine intake location, a temperature of fluid (e.g., air) within a compressor, a temperature of fluid (e.g., air) within a turbine, a temperature of fluid (e.g., air) within a combustion chamber, a temperature of fluid (e.g., air) at an engine exhaust location, a temperature of cooling fluids and/or heating fluids used in heat exchangers in or around an engine, and/or the like. The pressure sensor 156 may be a sensor that measures a fluid pressure (e.g., air pressure) in various locations in and/or around the engine 140, such as, for example, a fluid pressure (e.g., air pressure) at an engine intake, a fluid pressure (e.g., air pressure) within a compressor, a fluid pressure (e.g., air pressure) within a turbine, a fluid pressure (e.g., air pressure) within a combustion chamber, a fluid pressure (e.g., air pressure) at an engine exhaust location, and/or the like.

In some embodiments, each of the engines 140 may have a plurality of sensors 150 associated therewith (including one or more fan speed sensors 152, one or more temperature sensors 154, and/or one or more pressure sensors 156). That is, more than one of the same type of sensor 150 may be used to sense characteristics of an engine 140 (e.g., a sensor 150 for each of the different areas of the same engine 140). In some embodiments, one or more of the sensors 150 may be utilized to sense characteristics of more than one of the engines 140 (e.g., a single sensor 150 may be used to sense characteristics of two engines 140). The engines 140 may further include additional components not specifically described herein, and may include one or more additional sensors 150 incorporated with or configured to sense such additional components in some embodiments.

In embodiments, each of the sensors 150 (including, but not limited to, the fan speed sensors 152, the temperature sensors 154, and the pressure sensors 156) may be communicatively coupled to one or more components of the aircraft 130 such that signals and/or data pertaining to one or more sensed characteristics are transmitted from the sensors 150 for the purposes of determining, detecting, and/or predicting a fault, as well as completing one or more other actions in accordance with software programming that requires sensor information. As indicated by the dashed lines extending between the various sensors 150 (e.g., the fan speed sensors 152, the temperature sensors 154, and the pressure sensors 156) and the aircraft systems 144 and the engine controller 136 in the embodiment depicted in FIG. 1, the various sensors 150 may be communicatively coupled to the aircraft systems 144 and/or the engine controller 136 in some embodiments. As such, the various sensors 150 may be communicatively coupled via wires or wirelessly to the aircraft systems 144 and/or the engine controller 136 to transmit signals and/or data to the aircraft systems 144 and/or the engine controller 136.

It should be understood that the aircraft 130 merely represents one illustrative embodiment that may be configured to implement embodiments or portions of embodiments of the devices, systems, and methods described herein. During operation, the aircraft 130 (such as the engine controller 136 and/or another component) may diagnose or predict a system fault in one or more of the various aircraft systems 144. By way of non-limiting example, while the aircraft 130 is being operated, the control mechanism 160 may be utilized to operate one or more of the aircraft systems 144. Various sensors 150, including, but not limited to, the fan speed sensors 152, the temperature sensors 154, and/or the pressure sensors 156 may output data relevant to various characteristics of the engine 140 and/or the other aircraft systems 144. The engine controller 136 may utilize inputs from the control mechanism 160, the fan speed sensors 152, the temperature sensors 154, the pressure sensors 156, the various aircraft systems 144, one or more database, and/or information from airline control, flight operations, or the like to diagnose, detect, and/or predict faults that airline maintenance crew may be unaware of Among other things, the engine controller 136 may analyze the data output by the various sensors 150 (e.g., the fan speed sensors 152, the temperature sensors 154, the pressure sensors 156, etc.), over a period of time to determine drifts, trends, steps, or spikes in the operation of the engines 140 and/or the various other aircraft systems 144. The engine controller 136 may also analyze the system data to determine historic pressures, historic temperatures, pressure differences between the plurality of engines 140 on the aircraft 130, temperature differences between the plurality of engines 140 on the aircraft 130, and/or the like, and to diagnose, detect, and/or predict faults in the engines 140 and/or the various other aircraft systems 144 based thereon. Once a fault has been diagnosed, detected, and/or predicted, an indication may be provided on the aircraft 130 and/or at the ground system 120. It is contemplated that the diagnosis, detection, and/or prediction of faults may be completed during pre-flight checks, may be completed during flight, may be completed post flight, or may be completed after a plurality of flights has occurred. The aircraft wireless communications link 166 and the ground wireless communications link 122 may transmit data such that data and/or information pertaining to the fault may be transmitted off the aircraft 130.

It should be appreciated that, although a particular aerial vehicle has been illustrated and described in FIG. 1, other configurations and/or aerial vehicles, such as high speed compound rotary-wing aircraft with supplemental translational thrust systems, dual contra-rotating, coaxial rotor system aircraft, turboprops, tilt-rotors, tilt-wing aircraft, conventional take-off and landing aircraft and other turbine driven machines will also benefit from the present disclosure.

While the embodiment of FIG. 1 specifically relates to components within an aircraft 130, the present disclosure is not limited to such. That is, the various components depicted with respect to the aircraft 130 may be incorporated within various other types of craft and may function in a similar manner to perform the operations described herein. For example, the various components described herein with respect to the aircraft 130 may be present in watercraft, spacecraft, and/or the like without departing from the scope of the present disclosure.

Still referring to FIG. 1, the ground system 120 is generally a transmission system located on the ground that is capable of transmitting and/or receiving signals to/from the aircraft 130. That is, the ground system 120 may include a ground wireless communications link 122 that is communicatively coupled to the aircraft wireless communications link 166 wirelessly to transmit and/or receive signals and/or data. In some embodiments, the ground system 120 may be an air traffic control (ATC) tower and/or one or more components or systems thereof. Accordingly, the ground wireless communications link 122 may be a VHF communication system, an ACARS unit, a CPDLC system, FANS, and/or the like. Using the ground system 120 and the ground wireless communications link 122, the various non-aircraft components depicted in the embodiment of FIG. 1 may be communicatively coupled to the aircraft 130, even in instances where the aircraft 130 is airborne and in flight. However, it should be understood that the embodiment depicted in FIG. 1 is merely illustrative. In other embodiments, the aircraft 130 may be communicatively coupled to the various other components of the distributed control system 100 when on the ground.

Turning to FIG. 2, a schematic diagram of various components of the distributed control system 100 are depicted. Particularly, FIG. 2 depicts a schematic diagram of the engine controller 136. As explained above, in some embodiments, the engine controller 136 comprises FADEC system. As also explained above, the engine controller 136 comprises an electronic engine control (EEC) 200 and a distributed control module (DCM) 202. The EEC 200 is coupled to the DCM 202 through a data bus 204. In some embodiments, the data bus 204 comprises an Engine Area Distributed Interconnect Network (EADIN). Under the EADIN data bus protocol, the EEC 200 and the DCM 202 operate in a master/slave structure, where the EEC 200 is the master and the DCM 202 is the slave. Thus, the EEC 200 controls the operation of various components of the aircraft 130 through the DCM 202. In some examples, the engine controller 136 may be replaced with a component in an avionics system, a power distribution system, a propeller control system, or another device in the distributed control system 100.

The DCM 202 is coupled to a plurality of sensor nodes 206a, 206b, 206c and a plurality of actuator nodes 208a, 208b, 208c. In the illustration of FIG. 2, three sensor nodes and three actuator nodes are shown for purposes of illustration. However, it should be understood that the distributed control system 100 may include any number of sensor nodes and/or actuator nodes without departing from the scope of the present disclosure. The sensor nodes 206a, 206b, 206c send and receive data from a variety of sensors, such as the sensors 150 of FIG. 1. The actuator nodes 208a, 208b, 208c can control actuation devices such as the aircraft systems 144 of FIG. 1. In some embodiments, the nodes are all located on the aircraft 130. In other embodiments, some of the nodes may be located off the aircraft 130. In some embodiments, the engine controller 136 may include multiple distributed control modules 202 coupled to the EEC 200 through the data bus 204. In these embodiments, each DCM 202 may be coupled to a plurality of different nodes. In some examples, one or more of the actuator nodes 208a, 208b, 208c or the sensor nodes 206a, 206b, 206c may be a line-replaceable unit (LRU).

Military and/or civilian applications may include authentication and encryption along with the data bus 204 to prevent tampering. Furthermore, it is important that data from sensors on the aircraft and commands sent to actuators on the aircraft be processed quickly in order to maintain control of the engine 140 and support operation of the aircraft 130. In addition, high availability is desired to ensure safe engine operation. Thus, distributed engine control has tight real time constraints.

As discussed above, a Diffie-Hellman key exchange, or other methods of negotiating a secure, symmetric session key that may be used to encrypt data transmitted between devices may take up to several seconds to complete. As such, disclosed herein is a method of quickly establishing secure communication between devices before a new session key can be established.

In embodiments disclosed herein, when the EEC 200 and the DCM 202 begin a communication session, they may check whether a previously negotiated session key has been stored. If so, the stored session key may be used to encrypt and/or decrypt communication between the EEC 200 and the DCM 202. A new session key may then be negotiated while this communication is ongoing using a Diffie-Hellman key exchange or another method. Once the new session key is negotiated, the EEC 200 and the DCM 202 may either start using the new session key to encrypt and/or decrypt communication, or simply store the newly negotiated session key for a future communication session.

Alternatively, if a previously negotiated session key has not been stored (e.g., this is the first time the EEC 200 and the DCM 202 are communicating with each other) or previously stored session keys don't match and encrypted communication fails (e.g., either the EEC 200 or the DCM 202 has previously communicated with a different endpoint and as such, the EEC 200 and the DCM 202 have each stored different session keys), then the EEC 200 and the DCM 202 may begin unencrypted communication with each other (e.g., without using a session key). Then, while unencrypted communication is ongoing, a new session key may be securely negotiated. Once the new session key is negotiated, the EEC 200 and the DCM 202 may start using the new session to encrypt and/or decrypt communication. The new session key may also be stored for a future communication session. A similar communication protocol may be used for communication between the DCM 202 and the nodes 206a, 206b, 206c, 208a, 208b, or 208c in the example of FIG. 2, or between other components of the aircraft system 144.

Figure 3:
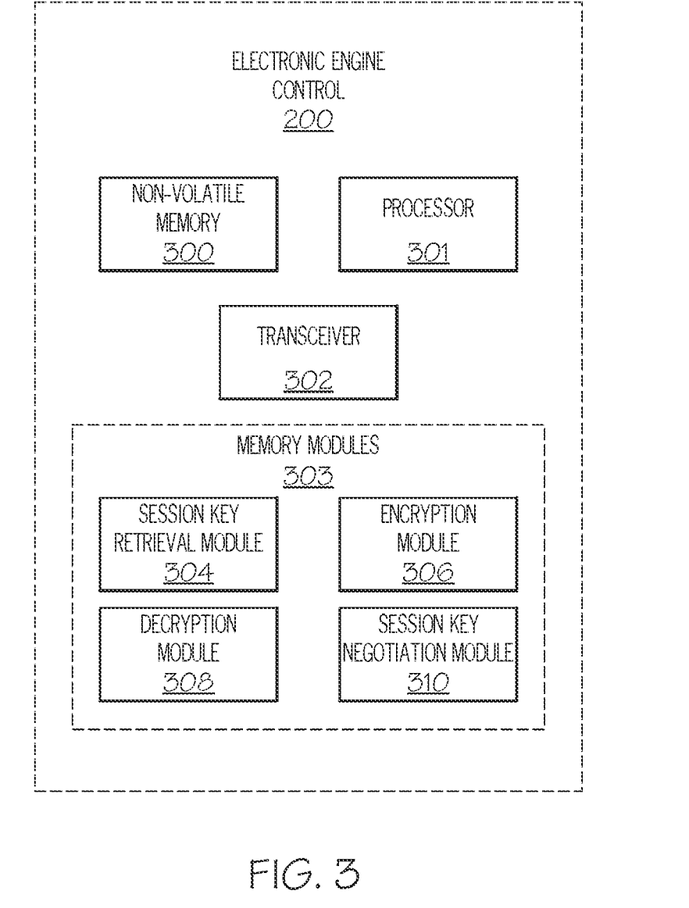
FIG. 3 schematically depicts the electronic engine control of FIGS. 1-2.

Turning to FIG. 3, a schematic diagram of the EEC 200 is shown. The EEC 200 includes a non-volatile memory 300, one or more processors 301, a transceiver 302, and one or more memory modules 303. The one or more processors 302 may be a controller, an integrated circuit, a microchip, a computer, or any other computing device. The one or more memory modules 303 may include RAM, ROM, flash memories, hard drives, or any device capable of storing machine readable and executable instructions such that the machine readable and executable instructions can be accessed by the one or more processors 301.

The one or more memory modules 303 may include a session key retrieval module 304, an encryption module 306, a decryption module 308, and a session key negotiation module 310. Each of the session key retrieval module 304, the encryption module 306, the decryption module 308, and the session key negotiation module 310 may be a program module in the form of operating systems, application program modules, and other program modules stored in the one or more memory modules 303. The one or more memory modules 303 may include, but are not limited to, routines, subroutines, programs, objects, components, data structures and the like for performing specific tasks or executing specific data types as will be described below.

The non-volatile memory 300 may store session keys negotiated by the session key negotiation module 310, as explained in further detail below. Once a session key is stored in the non-volatile memory 300, it may be used to encrypt communication in a future communication session, as explained in further detail below.

The transceiver 302 may send and receive messages to and from the data bus 204, where the messages can be directed to the DCM 202 or to other components of the aircraft system 144. In some examples, the transceiver 302 may transmit messages encrypted by the encryption module 306, as disclosed herein. In other examples, the transceiver 302 may transmit messages without encryption, as disclosed herein.

The session key retrieval module 304 may determine whether a previously negotiated session key is stored in the non-volatile memory 300. If a previously negotiated session key is stored in the non-volatile memory 300, the session key retrieval module 304 may retrieve the previously negotiated session key from the non-volatile memory 300. The retrieved session key may then be use for secure communications, as disclosed in further detail below.

In one example, multiple previously negotiated session keys may be stored in the non-volatile memory 300. For example, multiple session keys used to communicate with different devices (e.g., different nodes of the aircraft system 144) may be stored in the non-volatile memory 300. In this example, the session key retrieval module 304 may retrieve the appropriate session key associated with which communication is to begin. This ensures that both devices to communicate with each other will use the same session key.

In another example, multiple session keys negotiated with the same device on previous occasions may be stored in the non-volatile memory 300. For example, a new session may be negotiated and stored in the non-volatile memory 300 during each communication session between two devices. In this example, each time a session key is stored in the non-volatile memory 300, a timestamp may also be stored indicating a time that the session key is stored. Then, when the session key retrieval module 304 retrieves a previously negotiated session key from the non-volatile memory, the session key retrieval module 304 may retrieve the most recently stored session key. The other device to be communicated with may do the same thing, thereby ensuring that the two devices use the same session key.

The encryption module 306 may use the session key retrieved by the session key retrieval module 304 to encrypt messages. A message encrypted with the session key can only be decrypted by another holder of the session key, which ensures that the message cannot be decrypted if it is intercepted. Thus, the encryption module 306 may encrypt messages to send securely to the DCM 202.

In some examples, the encryption module 306 may utilize the session key to authenticate and/or verify a message without encrypting the message. For example, the encryption module 306 may utilize the session key to calculate a Message Authentication Code (MAC) of some sort, which may be transmitted along with the message by the transceiver 302. This may allow for verification of the transmitted message without utilizing the time and resources needed to perform encryption.

The decryption module 308 may use the session key retrieved by the session key retrieval module 304 to decrypt messages received by the transceiver 302. In particular, messages received from the DCM 202 that have been encrypted using the session key may be decrypted using the session key. Thus, the decryption module 308 may allow for secure communication between devices. In some examples, the transceiver 302 may receive a MAC along with a message and the decryption module 308 may utilize the session key to verify the MAC in order to ensure that the received message is authentic.

The session key negotiation module 310 may securely negotiate a session key with the DCM 202. As discussed above, negotiating a secure session key takes time to complete. Thus, communication between the EEC 200 and the DCM 202 may begin using either a previously negotiated session key or using unencrypted communication. While this communication is ongoing, the session key negotiation module 310 may negotiate a new session key in the background. In some examples, the session key negotiation module 310 may negotiate a session key using Diffie-Hellman key exchange. In other examples, any other method may be used to negotiate a session key.

In some examples, once the session key negotiation module 310 negotiates a new session key, the encryption module 306 and the decryption module 308 may use the new session key to encrypt and decrypt messages, respectively. In these examples, the newly negotiated session key may replace the previously negotiated session key to ensure secure communications. In other examples, the encryption module 306 and the decryption module 308 may continue to use the previously negotiated session key to encrypt and decrypt messages, respectively, even after the new session key is negotiated. In either case, after the session key negotiation module 310 negotiates a session key, the newly negotiated session key is stored in the non-volatile memory 300. This allows the newly negotiated session key to be used in a future communication session.

Figure 4:
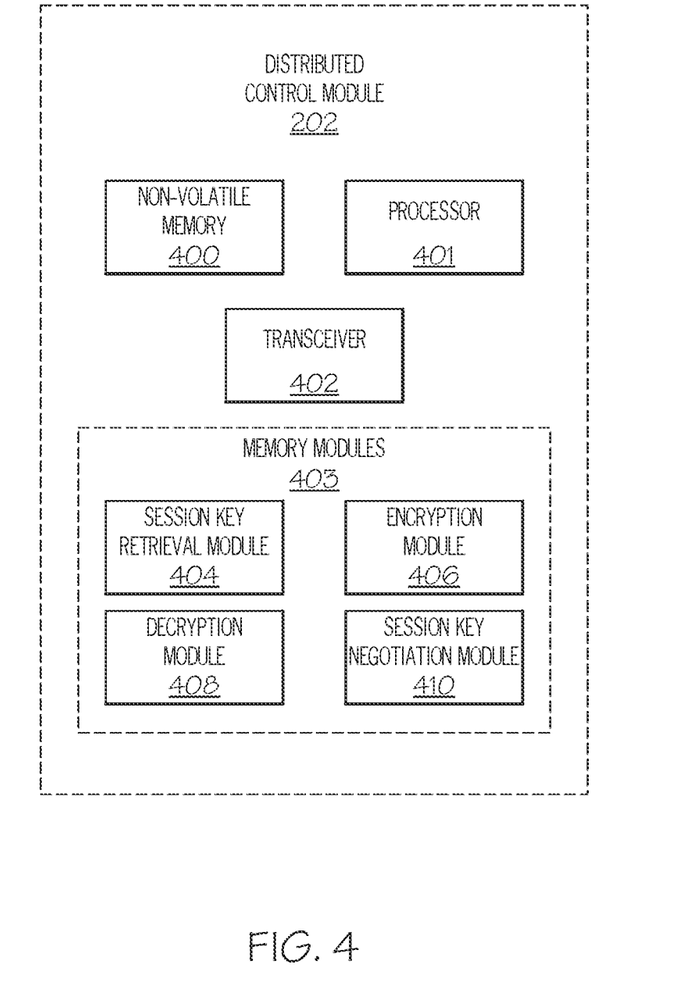
FIG. 4 schematically depicts the distributed control module of FIGS. 1-2.

Turning now to FIG. 4, a schematic diagram of the DCM 202 is shown. The DCM 202 includes a non-volatile memory 400, one or more processors 401, a transceiver 402, and one or memory modules 403. The one or more memory modules 403 may be capable of storing machine readable and executable instructions such that the machine readable and executable instructions can be accessed by the one or more processors 401. The one or more memory modules 403 may include a session key retrieval module 404, an encryption module 406, a decryption module 408, and a session key negotiation module 410.

The components of the DCM 202 are similar to the components of the electronic engine control 200 and will not be described in detail. The non-volatile memory 400 may store previously negotiated session keys. The one or more processors 401 may execute the one or more memory modules 403. The transceiver 402 may transmit and receive data to and from the EEC 200 or other components of the aircraft system 144. The session key retrieval module 404 may retrieve a previously negotiated session key from the non-volatile memory 400. The encryption module 406 may use a session key to encrypt data to be transmitted by the transceiver 402 key. The decryption module 408 may use a session key to decrypt messages received by the transceiver 402. The session key negotiation module 410 may negotiate a new session key with the EEC 200 while communication is ongoing using a previously negotiated session key, or in some circumstances, without encryption.

Accordingly, in operation, the first time the EEC 200 and the DCM 202 communicate with each other, no previously used session keys are stored on either device. Thus, the devices begin unencrypted communication with each other. Then, while unencrypted communication is ongoing, the session key negotiation modules 310 and 410 may negotiate a session key (e.g., using Diffie-Hellman key exchange). Once the session key is negotiated, the EEC 200 and the DCM 202 may stop communicating in an unsecure manner and may begin communicating securely using the negotiated session key. Accordingly, unencrypted communication between the devices can begin quickly. Then, once a session key is negotiated, communication can switch to using the session key, thereby minimizing the amount of time that unencrypted communication takes place. The newly negotiated session key can be stored in the non-volatile memories 300, 400 of the EEC 200 and the DCM 202, respectively, for future use.

The next time that the EEC 200 and the DCM 202 communicate with each other, the previously negotiated session key that is stored on the devices may be used to immediately begin secure communication. The session key negotiation modules 310, 410 may then negotiate a new session key. Once the new session key is negotiated, the devices may store the new session key for use in a future communication session.

Figure 5:
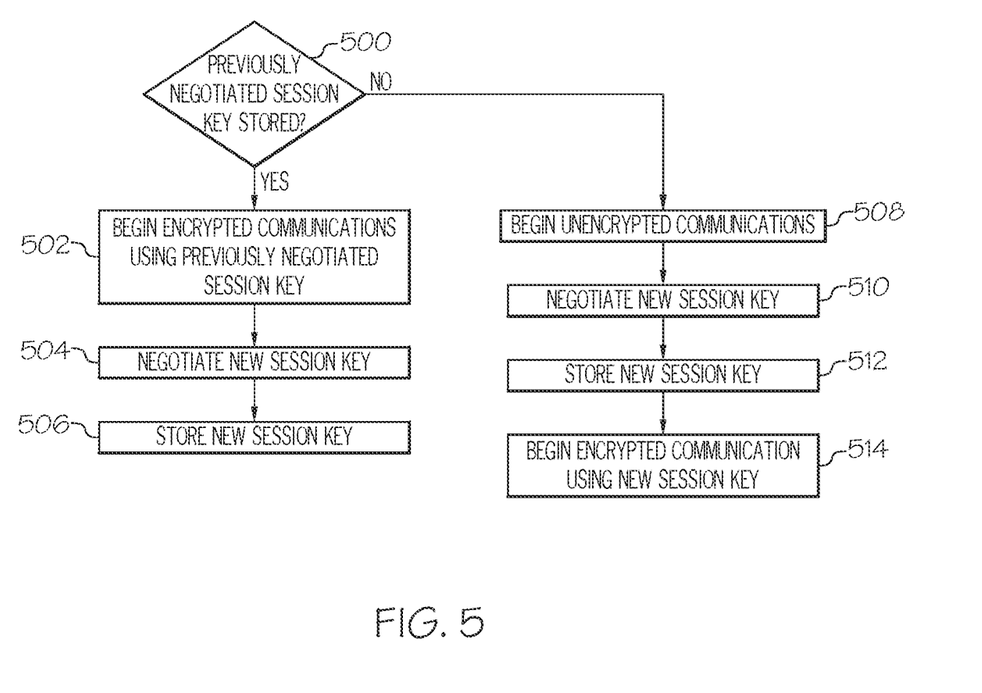
FIG. 5 depicts a flow diagram of an illustrative method of starting secure communications between embedded devices of the distributed control system of FIG. 1 according to one or more embodiments shown and described herein.

FIG. 5 depicts a flow diagram of an illustrative method of starting secure communication between devices such as between the EEC 200 and the DCM 202 of FIGS. 2-4. The example of FIG. 5 illustrates a method performed by the EEC 200 to communicate with another device. However, a similar method may be performed by the DCM 202 or other devices of the aircraft system 144.

At block 500, the session key retrieval module 304 determines whether a previously negotiated session key is stored in the non-volatile memory 300. If the session key retrieval module 304 determines that a previously negotiated session key is stored in the non-volatile memory 300 ("YES" at block 500), then control passes to block 502.

At block 502, the session key retrieval module 304 retrieves the previously negotiated session key and the electronic engine control 200 begins encrypted communications with another device using the retrieved, previously negotiated session key. Specifically, the encryption module 306 uses the previously negotiated session key to encrypt messages to be transmitted by the transceiver 302 and the decryption module 308 uses the previously negotiated session key to encrypt messages received by the transceiver 302.

At block 504, the session key negotiation module 310 negotiates a new session key with the device with which the electronic engine control 200 is communicating. The session key negotiation module 310 negotiates the new session key while the electronic engine control 200 communicates with the other device using the previously negotiated session key. In one example, the session key negotiation module 310 negotiates a new session key using a Diffie-Hellman key exchange. In other examples, the session key negotiation module 310 may use any other method to negotiate a new session key.

At block 506, after the session key negotiation module 310 negotiates a new session key, it stores the new session key in the non-volatile memory 300. The new session key may be used to perform secure communication during a future communication session.

If the session key retrieval module 304 determines that a previously negotiated session key is not stored in the non-volatile memory 300 ("NO" at block 500), then control passes to block 508. This may occur the first time that the electronic engine control 200 communicates with a particular device. In some examples, if encrypted communication with the other device fails in block 502 (e.g., the previously negotiated session key stored in the non-volatile memory 300 does not match a previously negotiated session key stored by the other device), control may also pass to block 508.

At block 508, the electronic engine control 200 begins unencrypted communications with the other device. At block 510, the session key negotiation module 310 negotiates a new session key with the other device. At block 512, after the session key negotiation module 310 negotiates the new session key, the session key negotiation module 310 stores the new session key in the non-volatile memory 300.

At block 514, the electronic engine control 200 ceases performing unencrypted communicating with the other device and begins encrypted communication with the device using the new session key. In particular, the encryption module 306 uses the new session key to encrypt messages to be transmitted by the transceiver 302 and the decryption module 308 uses the new session key to decrypt messages received by the transceiver 302.

Figure 6:
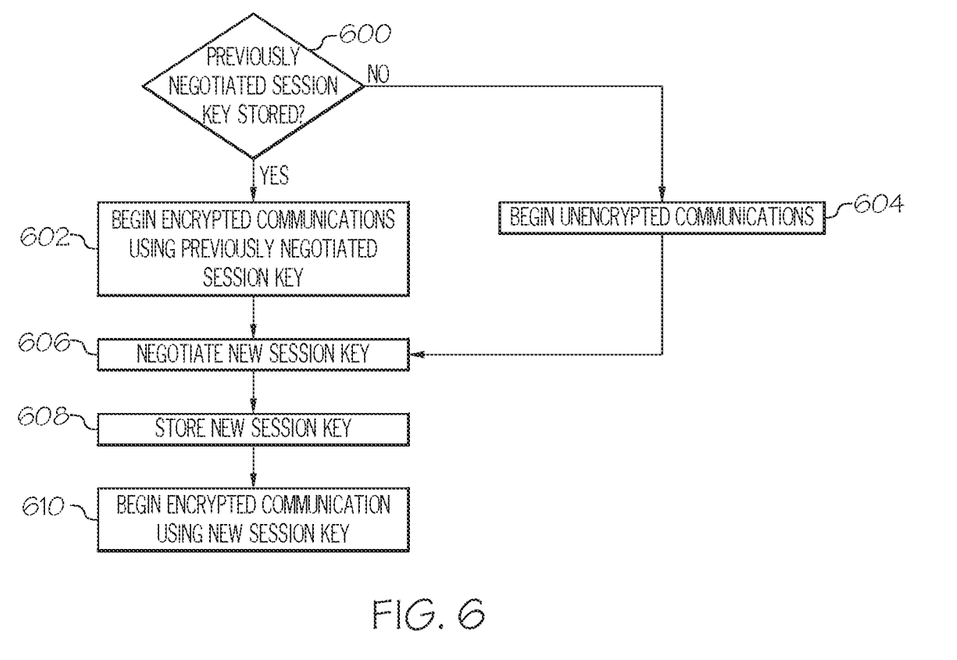
FIG. 6 depicts a flow diagram of another illustrative method of starting secure communications between embedded devices of the distributed control system of FIG. 1 according to one or more embodiments shown and described herein.

FIG. 6 depicts a flow diagram of another illustrative method of starting secure communication between devices such as between the EEC 200 and the DCM 202 of FIGS. 2-4. The example of FIG. 6 illustrates a method performed by the EEC 200 to communicate with another device. However, a similar method may be performed by the DCM 202 or other devices of the aircraft system 144.

At block 600, the session key retrieval module 304 determines whether a previously negotiated session key is stored in the non-volatile memory 300. If the session key retrieval module 304 determines that a previously negotiated session key is stored in the non-volatile memory 300 ("YES" at block 600), then control passes to block 602.

At block 602, the session key retrieval module 304 retrieves the previously negotiated session key and the electronic engine control 200 begins encrypted communications with another device using the retrieved, previously negotiated session key. If the session key retrieval module 304 determines that a previously negotiated session key is not stored in the non-volatile memory 300 ("NO" at block 600), then at block 604, the electronic engine control 200 begins unencrypted communication with the device. In some examples, if encrypted communication with the other device fails in block 502 (e.g., the previously negotiated session key stored in the non-volatile memory 300 does not match a previously negotiated session key stored by the other device), then control may pass to block 604 and the electronic engine control 200 may begin unecrypted communication with the device.

At block 606, the session key negotiation module 310 negotiates a new session key with the device with which the electronic engine control 200 is communicating. The session key negotiation module 310 may negotiate the new session key using a Diffie-Hellman key exchange, or another method.

At block 608, after the session key negotiation module 310 negotiates the new session key, it stores the new session key in the non-volatile memory 300. At block 610, the electronic engine control 200 ceases communicating with the other device either using the previously negotiated session key or in an unencrypted manner and begins encrypted communication with the device using the new session key.

It should now be understood that that the devices, systems, and methods described herein utilize devices, systems, and methods for starting secure communication in in system with high availability. When a device begins communicating with another device, the device may determine whether a previously negotiated session key is stored on the device. If so, the device may begin encrypted communication using the previously negotiated session key. If not, the device may begin unencrypted communication. The device may then negotiate a new session key. After the new session key is negotiated, communication may continue using the new session key and the new session key may be stored on the device to be used during future communication sessions. For example, an electronic engine control of an aircraft system may utilize the disclosed techniques to establish secure communications with a distributed device of the aircraft system.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Further aspects of the disclosure are provided by the subject matter of the following clauses.

A distributed control system comprising an electronic control unit; and one or more distributed control modules, wherein the electronic control unit is configured to establish secure communication with a distributed control module of the one or more distributed control modules by, upon determination that a previously negotiated session key is stored on the electronic control unit, transmitting encrypted communications between the electronic control unit and the distributed control module using the previously negotiated session key; negotiating a new session key with the distributed control module; and storing the new session key; and upon determination that the previously negotiated session key is not stored on the electronic control unit, transmitting un encrypted communications between the electronic control unit and the distributed control module; negotiating the new session key with the distributed control module; and after negotiating the new session key with the distributed control module, ceasing transmission of unencrypted communications between the electronic control unit and the distributed control module; transmitting encrypted communications between the electronic control unit and the distributed control module using the new session key; and storing the new session key.

The distributed control system of any preceding clause, wherein the electronic control unit is further configured to negotiate the new session key with the distributed control module using a Diffie-Hellman key exchange protocol.

The distributed control system of any preceding clause, wherein the electronic control unit is further configured to store the new session key in a non-volatile memory.

The distributed control system of any preceding clause, wherein, after the new session key is negotiated, the electronic control unit is further configured to cease transmission of encrypted communications with the distributed control module using the previously negotiated session key; and transmit encrypted communications with the distributed control module using the new session key.

The distributed control system of any preceding clause, wherein, upon determination that multiple session keys previously negotiated with the distributed control module are stored on the electronic control unit, determining which one of the multiple session keys previously negotiated with the distributed control module was most recently stored on the electronic control unit; and transmitting encrypted communications between the electronic control unit and the distributed control module using the determined session key from among the multiple session keys previously negotiated with the distributed control module that most recently stored on the electronic control unit.

The distributed control system of any preceding clause, wherein the electronic control unit is further configured to store the new session key along with an indication of when the new session key is stored.

The distributed control system of any preceding clause, wherein, when encrypted communication between the electronic control unit and the distributed control module fails, the electronic control unit is further configured to transmit unencrypted communications between the electronic control unit and the distributed control module; negotiate the new session key with the distributed control module; and after negotiating the new session key with the distributed control module, cease transmission of unencrypted communications between the electronic control unit and the distributed control module; transmit encrypted communications between the electronic control unit and the distributed control module using the new session key; and store the new session key.

A method of establishing secure communication between a server and a device, the method comprising, with the server, upon determination that a previously negotiated session key is stored on the server, transmitting encrypted communications between the server and the device using the previously negotiated session key; negotiating a new session key with the device; and storing the new session key; and upon determination that the previously negotiated session key is not stored on the server, transmitting unencrypted communications between the server and the device; negotiating the new session key with the device; and after negotiating the new session key with the device, ceasing transmission of unencrypted communications between the server and the device; transmitting encrypted communications between the server and the device using the new session key; and storing the new session nkey.

The method of any preceding clause, further comprising negotiating the new session key with the device using a Diffie-Hellman key exchange protocol.

The method of any preceding clause, further comprising storing the new session key in a non-volatile memory.

The method of any preceding clause, further comprising, after negotiating the new session key, ceasing transmission of encrypted communications between the server and the device using the previously negotiated session key; and transmitting encrypted communications between the server and the device using the new session key.

The method of any preceding clause, further comprising, upon determination that multiple session keys previously negotiated with the device are stored on the server, determining which one of the multiple session keys previously negotiated with the device was most recently stored on the server; and transmitting encrypted communication between the server and the device using the determined session key from among the multiple session keys previously negotiated with the device that was most recently stored on the server.

The method of any preceding clause, further comprising storing the new session key along with an indication of when the new session key is stored.

The method of any preceding clause, further comprising, when encrypted communication between the server and the device fails, transmitting unencrypted communications between the server and the device; negotiating the new session key with the device; and after negotiating the new session key with the device, ceasing transmission of unencrypted communications between the server and the device; transmitting encrypted communications between the server and the device using the new session key; and storing the new session key.

An electronic engine control comprising a non-volatile memory to store one or more negotiated session keys; a transceiver to transmit messages to and receive messages from a device; a session key retrieval module to retrieve previously negotiated session keys from the non-volatile memory; an encryption module to encrypt messages using a session key to be transmitted by the transceiver; a decryption module to decrypt messages received by the transceiver using the session key; and a session key negotiation module to negotiate a new session key with one or more devices.

The electronic engine control of any previous clause, wherein the session key negotiation module is configured to negotiation the new session key with the device using a Diffie-Hellman key exchange protocol.

The electronic engine control of any previous clause, wherein the session key retrieval module is configured to determine whether a previously negotiated session key is stored in the non-volatile memory; and upon determination that the previously negotiated session key is stored in the non-volatile memory, the session key retrieval module is configured to retrieve the previously negotiated session key; the encryption module is configured to encrypt messages to be transmitted by the transceiver using the previously negotiated session key; the decryption module is configured to decrypt messages received by the transceiver using the previously negotiated session key; the session key negotiation module is configured to negotiate the new session key with the device; and the session key negotiation module is configured to store the new session key in the non-volatile memory.

The electronic engine control of any previous clause, wherein after the session key negotiation module negotiates the new session key with the device, the encryption module is configured cease encrypting messages using the previously negotiated session key; the decryption module is configured to cease decrypting messages using the previously negotiated session key; the encryption module is configured to encrypt messages to be transmitted by the transceiver using the new session key; and the decryption module is configured to decrypt messages received by the transceiver using the new session key.

The electronic engine control of any previous clause, wherein, upon determination that multiple session keys previously negotiated with the device are stored in the non-volatile memory, the session key retrieval module is configured to determine which one of the multiple session keys previously negotiated with the device was most recently stored in the non-volatile memory; and retrieve the determined session key from among the multiple session keys previously negotiated with the device that was most recently stored in the non-volatile memory.

The electronic engine control of any previous clause, wherein, upon determination that the previously negotiated session key is not stored in the non-volatile memory, the transceiver transmits unencrypted communication between the electronic engine control and the device; the session key negotiation module negotiates the new session key with the device; and after the session key negotiation module negotiates the new session key with the device, the encryption module encrypts messages to be transmitted by the transceiver using the new session key; and the decryption module decrypts messages received by the transceiver using the new session key

What is claimed is:

1. A distributed control system comprising:
   a first computing device; and
   one or more second computing devices,
   wherein the first computing device comprises one or more processors configured to establish secure communication with a third computing device among the one or more second computing devices by:
   upon determination that a previously negotiated session key is stored on the first computing device:
   transmitting encrypted communications between the first computing device and the third computing device using the previously negotiated session key;
   negotiating a new session key with the third computing device; and
   storing the new session key; and
   upon determination that the previously negotiated session key is not stored on the first computing device:
   transmitting unencrypted communications between the first computing device and the third computing device;
   negotiating the new session key with the third computing device; and
   after negotiating the new session key with the third computing device:
   ceasing transmission of unencrypted communications between the first computing device and the third computing device;
   transmitting encrypted communications between the first computing device and the third computing device using the new session key; and
   storing the new session key.

2. The distributed control system of claim 1, wherein the one or more processors are further configured to:
   negotiate the new session key with the third computing device using a Diffie-Hellman key exchange protocol.

3. The distributed control system of claim 1, wherein the one or more processors are further configured to:
   store the new session key in a non-volatile memory.

4. The distributed control system of claim 1, wherein, after the new session key is negotiated upon determination that the previously negotiated session key is stored on the first computing device, the one or more processors are further configured to:
   cease transmission of encrypted communications with the third computing device using the previously negotiated session key; and
   transmit encrypted communications with the third computing device using the new session key.

5. The distributed control system of claim 1, wherein, upon determination that multiple session keys previously negotiated with the third computing device are stored on the first computing device, the one or more processors are further configured to:
   determine which one of the multiple session keys previously negotiated with the third computing device was most recently stored on the first computing device; and
   transmit encrypted communications between the first computing device and the third computing device using the determined session key from among the multiple session keys previously negotiated with the third computing device that most recently stored on the first computing device.

6. The distributed control system of claim 1, wherein, the one or more processors are further configured to:

store the new session key along with an indication of when the new session key is stored.

7. The distributed control system of claim 1, wherein, when encrypted communication between the first computing device and the third computing device fails, the one or more processors are further configured to:
transmit unencrypted communications between the first computing device and the third computing device;
negotiate the new session key with the third computing device; and
after negotiating the new session key with the third computing device:
cease transmission of unencrypted communications between the first computing device and the third computing device;
transmit encrypted communications between the first computing device and the third computing device using the new session key; and
store the new session key.

8. A method of establishing secure communication between a server and a device, the method comprising:
with the server, upon determination that a previously negotiated session key is stored on the server:
transmitting encrypted communications between the server and the device using the previously negotiated session key;
negotiating a new session key with the device; and
storing the new session key; and
upon determination that the previously negotiated session key is not stored on the server:
transmitting unencrypted communications between the server and the device;
negotiating the new session key with the device; and
after negotiating the new session key with the device:
ceasing transmission of unencrypted communications between the server and the device;
transmitting encrypted communications between the server and the device using the new session key; and
storing the new session key.

9. The method of claim 8, further comprising:
negotiating the new session key with the device using a Diffie-Hellman key exchange protocol.

10. The method of claim 8, further comprising:
storing the new session key in a non-volatile memory.

11. The method of claim 8, further comprising, after negotiating the new session key upon determination that the previously negotiated session key is stored on the server:
ceasing transmission of encrypted communications between the server and the device using the previously negotiated session key; and
transmitting encrypted communications between the server and the device using the new session key.

12. The method of claim 8, further comprising
upon determination that multiple session keys previously negotiated with the device are stored on the server:
determining which one of the multiple session keys previously negotiated with the device was most recently stored on the server; and
transmitting encrypted communications between the server and the device using the determined session key from among the multiple session keys previously negotiated with the device that was most recently stored on the server.

13. The method of claim 8, further comprising:
storing the new session key along with an indication of when the new session key is stored.

14. The method of claim 8, further comprising:
when encrypted communication between the server and the device fails:
transmitting unencrypted communications between the server and the device;
negotiating the new session key with the device; and
after negotiating the new session key with the device:
ceasing transmission of unencrypted communications between the server and the device;
transmitting encrypted communications between the server and the device using the new session key; and
storing the new session key.

15. A computing device comprising:
a non-volatile memory to store one or more negotiated session keys;
a transceiver to transmit messages to and receive messages from a second computing device; and
one or more processors configured to:
retrieve previously negotiated session keys from the non-volatile memory;
encrypt messages using a session key to be transmitted by the transceiver;
decrypt messages received by the transceiver using the session key; and
negotiate a new session key with one or more devices.

16. The computing device of claim 15, wherein the one or more processors are configured to negotiation the new session key with the second computing device using a Diffie-Hellman key exchange protocol.

17. The computing device of claim 15, wherein the one or more processors are further configured to:
determine whether a previously negotiated session key is stored in the non-volatile memory; and
upon determination that the previously negotiated session key is stored in the non-volatile memory:
retrieve the previously negotiated session key;
encrypt messages to be transmitted by the transceiver using the previously negotiated session key;
decrypt messages received by the transceiver using the previously negotiated session key;
negotiate the new session key with the second computing device; and
store the new session key in the non-volatile memory.

18. The computing device of claim 17, wherein after the one or more processors negotiate the new session key with the second computing device, the one or more processors are further configured to:
cease encrypting messages using the previously negotiated session key;
cease decrypting messages using the previously negotiated session key;
encrypt messages to be transmitted by the transceiver using the new session key; and
decrypt messages received by the transceiver using the new session key.

19. The computing device of claim 17, wherein, upon determination that multiple session keys previously negotiated with the second computing device are stored in the non-volatile memory, the one or more processors are configured to:
determine which one of the multiple session keys previously negotiated with the second computing device was most recently stored in the non-volatile memory; and
retrieve the determined session key from among the multiple session keys previously negotiated with the second computing device that was most recently stored in the non-volatile memory.

20. The computing device of claim 17, wherein, upon determination that the previously negotiated session key is not stored in the non-volatile memory:
- the transceiver transmits unencrypted communication between the computing device and the second computing device;
- the one or more processors negotiate the new session key with the second computing device; and
- after the one or more processors negotiate the new session key with the second computing device:
- the one or more processors encrypt messages to be transmitted by the transceiver using the new session key; and
- the one or more processors decrypt messages received by the transceiver using the new session key.

* * * * *